US012707025B2

(12) United States Patent
Lindmark

(10) Patent No.: US 12,707,025 B2
(45) Date of Patent: Aug. 11, 2026

(54) INCREASING READABILITY OF WATERMARKED CONTENT IN A VIRTUAL MEETING

(71) Applicant: Google LLC, Mountain View, CA (US)

(72) Inventor: Stefan Lindmark, Östhammar (SE)

(73) Assignee: Google LLC, Mountain View, CA (US)

( * ) Notice: Subject to any disclaimer, the term of this patent is extended or adjusted under 35 U.S.C. 154(b) by 93 days.

(21) Appl. No.: 18/602,430

(22) Filed: Mar. 12, 2024

(65) Prior Publication Data

US 2025/0294118 A1 Sep. 18, 2025

(51) Int. Cl.
*H04N 7/15* (2006.01)
*G06T 1/00* (2006.01)

(52) U.S. Cl.
CPC ........... *H04N 7/157* (2013.01); *G06T 1/0021* (2013.01); *H04N 7/152* (2013.01)

(58) Field of Classification Search
CPC ....... H04N 7/157; H04N 7/152; G06T 1/0021
See application file for complete search history.

(56) References Cited

U.S. PATENT DOCUMENTS

2008/0193860 A1* 8/2008 Hains ............... G03G 15/04027 358/1.9
2014/0133693 A1* 5/2014 Park ................. H04N 21/23892 382/100
2020/0372136 A1* 11/2020 Joung ................... H04L 51/063
2021/0056183 A1* 2/2021 Zhou .................. H04N 1/32325
2023/0208663 A1* 6/2023 Jovanovic .............. H04N 7/147 709/204

* cited by examiner

*Primary Examiner* — Stella L. Woo
(74) *Attorney, Agent, or Firm* — Lowenstein Sandler LLP

(57) ABSTRACT

Methods and systems for increasing readability of watermarked content in a virtual meeting. Content presented to a participant of a plurality of participants during the virtual meeting is identified, and it is determined whether watermarking of the content is to be performed. Responsive to determining that the watermarking is to be performed, a watermark is superimposed on the content. The content with the watermark is displayed in a virtual meeting user interface on the first client device. Responsive to input of the first participant, a position of the watermark with respect to the content is modified in the virtual meeting user interface.

20 Claims, 11 Drawing Sheets

WATERMARK

INCREASING READABILITY OF WATERMARKED CONTENT IN A VIRTUAL MEETING

TECHNICAL FIELD

Aspects and implementations of the present disclosure relate to increasing readability of watermarked content in a virtual meeting.

BACKGROUND

Virtual meetings can take place between multiple participants via a virtual meeting platform. A virtual meeting platform can include tools that allow multiple client devices to be connected over a network and share each other's audio (e.g., voice of a user recorded via a microphone of a client device) and/or video stream (e.g., a video captured by a camera of a client device, or video captured from a screen image of the client device) for efficient communication. Participants, during virtual meetings, can share visual content using the virtual meeting platform which allows other participants to view and discuss the shared visual content in real-time for more collaborative discussions and enhanced communication.

SUMMARY

The below summary is a simplified summary of the disclosure in order to provide a basic understanding of some aspects of the disclosure. This summary is not an extensive overview of the disclosure. It is intended neither to identify key or critical elements of the disclosure, nor to delineate any scope of the particular implementations of the disclosure or any scope of the claims. Its sole purpose is to present some concepts of the disclosure in a simplified form as a prelude to the more detailed description that is presented later.

In some implementations, a system and method are disclosed for increasing readability of watermarked content in a virtual meeting. The method includes determining whether to perform watermarking of content presented during a virtual meeting on a first client device of a first participant of a plurality of participants of the virtual meeting. The method further includes responsive to determining to perform the watermarking of the content, superimposing a watermark on the content. The method further includes displaying, in a virtual meeting user interface on the first client device, the content with the watermark. The method further includes responsive to input of the first participant, modifying a position of the watermark with respect to the content in the virtual meeting user interface.

In some implementations, the input of the first participant corresponds to a selection of a portion of the watermark, and a movement gesture within the virtual meeting user interface.

In some implementations, determining whether to perform watermarking of the content includes determining whether a watermarking option is enabled for at least one of the virtual meeting or the content.

In some implementations, modifying the position of the watermark with respect to the content in the virtual meeting user interface includes identifying a new position for a first portion of the watermark. Modifying the position of the watermark with respect to the content in the virtual meeting user interface further includes moving, based on the new position, the first portion of the watermark from a current position to the new position in the virtual meeting user interface.

In some implementations, modifying the position of the watermark with respect to the content in the virtual meeting user interface includes determining whether a second portion of the watermark extends past a first boundary of the virtual meeting user interface. Modifying the position of the watermark with respect to the content in the virtual meeting user interface further includes responsive to determining that the second portion of the watermark extends past the first boundary of the virtual meeting user interface, causing the second portion of the watermark to reappear by a second boundary of the virtual meeting user interface, wherein the first boundary of the virtual meeting user interface is opposite to the second boundary of the virtual meeting user interface.

In some implementations, moving, based on the new position, the first portion of the watermark from the current position to the new position in the virtual meeting user interface includes determining whether a second portion of the watermark extends past the first boundary of the virtual meeting user interface. Moving, based on the new position, the first portion of the watermark from a current position to the new position in the virtual meeting user interface further includes responsive to determining that the second portion of the watermark extends past the first boundary of the virtual meeting user interface, causing a third portion of the watermark to appear by a second boundary of the virtual meeting user interface, wherein the first boundary of the virtual meeting user interface is opposite to the second boundary of the virtual meeting user interface.

In some implementations, the watermark includes at least one of: information pertaining to the first participant, information pertaining to the virtual meeting, a current time stamp, or a unique identifier.

In some implementations, the content is one of: a representation of a video stream of a second participant of the plurality of participants, a representation of a video playback, an image, a document, or a software product.

BRIEF DESCRIPTION OF THE DRAWINGS

Aspects and implementations of the present disclosure will be understood more fully from the detailed description given below and from the accompanying drawings of various aspects and implementations of the disclosure, which, however, should not be taken to limit the disclosure to the specific aspects or implementations, but are for explanation and understanding only.

DETAILED DESCRIPTION

Figure 1:
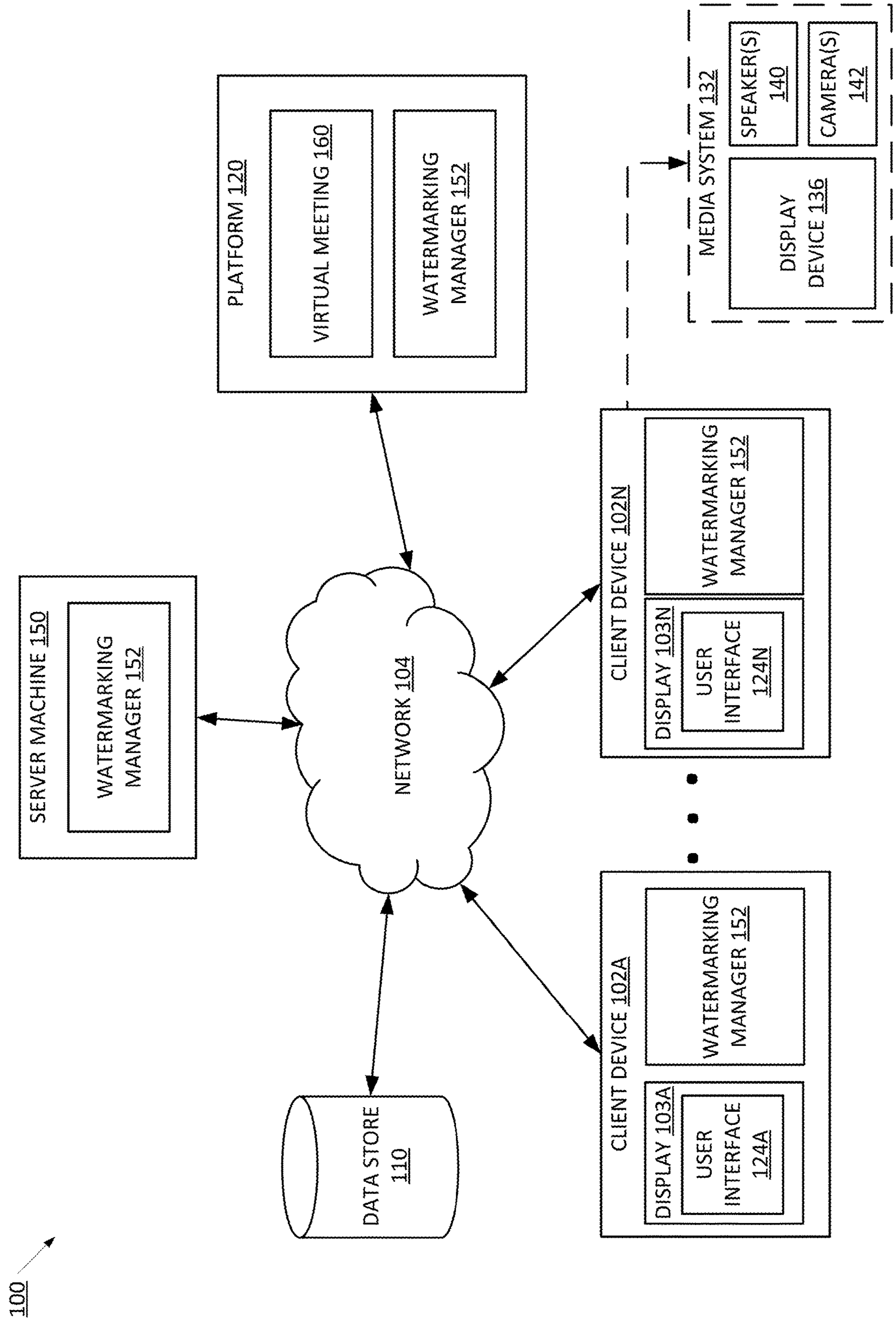
FIG. 1 illustrates an example system architecture, in accordance with implementations of the present disclosure.

Aspects of the present disclosure relate to increasing readability of watermarked content in a virtual meeting. A virtual meeting platform (or platform) can include tools that allow multiple client devices to be connected over a network and share each other's audio (e.g., voice of a user recorded via a microphone of a client device) and/or video stream (e.g., a video captured by a camera of a client device, or video captured from a screen image of the client device) for efficient communication. The platform can be used to establish a virtual meeting between multiple participants (e.g., a user of a virtual meeting platform on a client device).

During a virtual meeting, one of the participants (e.g., a presenting participant) in the virtual meeting can present visual content in real-time to other participants of the virtual meeting (e.g., observing participant(s)). The visual content can be content of a user interface (UI) on the client device of the presenting participant, or content of a portion of the UI on the client device of the presenting participant, or any other content viewable by one or more participants of the virtual meeting, including an image, a video, a document, a software code, etc.

In some instances, the presenting participant may wish to protect the confidentiality of the visual content. Accordingly, the presenting participant can send a request to the platform to enable watermarking to protect the confidentiality of the visual content. Watermarking used in video conferencing may refer to an image (identified as a watermark) that has a specific level of transparency and that appears over the visual content presented to one or more participants of the virtual meeting (e.g., in a region of the virtual meeting UI).

In some conventional virtual meeting platforms, the presenting participant can provide the visual content to the platform for watermarking to request the platform to create a watermarked visual content. The resulting watermarked visual content can then be presented to the observing participant(s). However, the positioning of the watermark on top of the visual content is typically fixed for the observing participant(s) regardless of the type of client device used by observing participant(s) to participate in the virtual meeting, which may result in the watermark not being presented within the boundaries of the screen or a UI window. Furthermore, no modification can be made to the watermarked visual content, and if the watermark happens to cover some information within the visual content, making it hard to read, that unreadable information can be irrevocably lost.

In some conventional virtual meeting platforms, to avoid the fixed positioning of the watermark on top of the visual content for the observing participant(s) regardless of the type of their client devices, the presenting participant can provide the visual content to a client device of each observing participant with a request to apply watermarking. Accordingly, each client device of the observing participant can apply the watermark to generate a watermarked visual content tailored to their own type of client device, taking into consideration display and/or window size. However, similarly to the watermarked visual content generated by the platform, the watermark in the watermarked visual content generated by a client device cannot be modified either, resulting in loss of information rendered unreadable by the watermark within the visual content.

Some conventional virtual meeting platforms, prior to generating the watermarked visual content, can allow a participant to set a level of transparency for the watermark being applied to the visual content. The level of transparency for the watermark can range from 0% transparency (e.g., opaque or no transparency) to 100% transparency (e.g., fully transparent). However, this approach forces the presenting participant to decide between protection (e.g., opaque watermark) and readability (e.g., fully transparent watermark), and does not provide a workable solution for achieving both.

Aspects of the present disclosure address the above and other deficiencies by providing a technique that enables increased readability of watermarked content in a virtual meeting. In particular, a client device of an observing participant of the virtual meeting can present content (e.g., content shared by a presenting participant of the virtual meeting, content obtained by the observing participant from local storage or external source, etc.), and determine whether to perform watermarking of the content. Responsive to determining to perform the watermarking of the content, the client device of the observing participant can superimpose a "dynamic" watermark on the content, UI of the virtual meeting, or a portion of the UI on the client device of the observing participant. The watermark is referred to as dynamic (or interactive) to indicate that its position on top of the content is not fixed and that it can be moved in one or more directions with respect to the content. For example, when the content with the watermark is displayed on a UI of the client device of the observing participant, the observing participant can provide input indicating a request to move the watermark. In response, a position of the watermark with respect to the content can be adjusted accordingly. In some implementations, the dynamic watermark can be moved in any directions to make portions of the content that were otherwise obstructed by the watermark visible (e.g., completely readable). In some implementations, if responsive to the input of the observing participant a portion of the dynamic watermark extends over a boundary of the UI on the client device of the observing participant, the dynamic watermark is caused to reappear by an opposite boundary of the UI to maintain adequate watermark protection.

Accordingly, aspects of the present disclosure provide techniques that enable the observing participant to adjust the positioning of the watermark to view portions of the content that can be otherwise obstructed by a static watermark. The readability and full contextual understanding of the content is provided while maintaining protection from unauthorized sharing of the content thereby facilitating use of watermarking, which in turn leads to improved security of virtual meeting platforms and/or other content sharing platforms.

It should be noted that the use of watermarks should not be construed to limit the scope of the present disclosure, and that the present disclosure should be applicable to various other types graphics including, for example, bar codes, emojis, and the like.

FIG. 1 illustrates an example system architecture 100, in accordance with implementations of the present disclosure. The system architecture 100 (also referred to as "system" herein) includes client devices 102A-N (collectively and individually referred to as client device 102 herein), a data store 110, a platform 120, and/or a server machine 150 each connected to a network 104. In implementations, network 104 can include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof.

In some implementations, data store 110 is a persistent storage that is capable of storing data as well as data structures to tag, organize, and index the data. In some embodiments, a data item can correspond to one or more portions of a document and/or a file displayed via a graphical user interface (GUI) on a client device 102, in accordance with embodiments described herein. Data store 110 can be hosted by one or more storage devices, such as main memory, magnetic or optical storage-based disks, tapes or hard drives, NAS, SAN, and so forth. In some implementations, data store 110 can be a network-attached file server, while in other embodiments data store 110 can be some other type of persistent storage such as an object-oriented database, a relational database, and so forth, that can be hosted by platform 120 or one or more different machines coupled to the platform 120 via network 104.

Platform 120 can enable users of client devices 102A-N to connect with each other via a virtual meeting (e.g., virtual meeting 160). A virtual meeting 160 can be a real-time communication session such as a video-based virtual meeting, which includes a meeting during which a client device 102 connected to platform 120 captures and transmits image data (e.g., collected by a camera of a client device 102) and/or audio data (e.g., collected by a microphone of the client device 102) to other client devices 102 connected to platform 120. The image data can, in some embodiments, depict a user or group of users that are participating in the virtual meeting 160. The audio data can include, in some embodiments, an audio recording of audio provided by the user or group of users during the virtual meeting 160. In additional or alternative embodiments, the virtual meeting 160 can be a real-time communication session such as an audio-based virtual meeting, which includes a meeting during which a client device 102 captures and transmits audio data (e.g., without generating and/or transmitting image data) to other client devices 102 connected to platform 120. Real-time communication refers to the ability for users to communicate (e.g., exchange information) instantly without transmission delays and/or with negligible (e.g., milliseconds or microseconds) latency. In some instances, a virtual meeting can include or otherwise be referred to as a conference call. In such instances, a video-based virtual meeting can include or otherwise be referred to as a video-based conference call and an audio-based virtual meeting can include or otherwise be referred to as an audio-based conference call.

In some implementations, the platform 120 (or the server 150) may include a virtual meeting manager (not shown) that can manage a virtual meeting 160 between multiple users of the platform 120. In some implementations, the virtual meeting manager may provide the virtual meeting UIs 124A-124N to each client device 102A-N, 104 to enable users to watch and listen to each other during a virtual meeting 160. The virtual meeting manager can also collect and provide data associated with the virtual meeting 160 to each participant of the virtual meeting 160. In some implementations, the virtual meeting manager can determine visual items for presentation in the UIs 124A-124N during a virtual meeting 160. A visual item can refer to a UI element that occupies a particular region in the UI 124A-124N and is dedicated to presenting a video stream from a respective client device. Such a video stream can depict, for example, a user of the respective client device 102A-N, 104 while the user is participating in the virtual meeting 160 (e.g., speaking, presenting, listening to other participants, watching other participants, etc., at particular moments during the virtual meeting 160), a physical conference or meeting room (e.g., with one or more participants present), a document or media content (e.g., video content, one or more images, etc.) being presented during the virtual meeting 160, etc. The visual items for presentation can be determined based on current speaker, current presenter, order of the participants joining the virtual meeting 160, list of participants (e.g., alphabetical), configuration settings, etc. The UI 124A-124N can include multiple regions. Each region can display a visual item corresponding to a video stream pertaining to one or more participants of the virtual meeting 160. The virtual meeting manager can control which video stream's visual item is to be displayed in a specific region of a virtual meeting UI 124A-124N. The virtual meeting manager may generate the UIs 124A-124N for the different client devices 102A-102N, 104 and provide the UIs 124A-124N to the client devices 102A-102N, 104. The virtual meeting manager may generate different UIs 124A-124N for different client devices 102A-102N, 104. In some implementations, the virtual meeting manager may generate partial virtual meeting UIs 124A-124N for client applications of client devices 102A-102N, 104, and the client applications may finalize the UIs 124A-124N for display on the displays 103A-103N.

In some implementations, the virtual meeting platform 120 or the server 150 can include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that can be used to enable a user to connect with other users via a virtual meeting 160. The virtual meeting platform 120 can also include a website (e.g., one or more webpages) or application back-end software that can be used to enable a user to connect with other users by way of the virtual meeting 160.

The client devices 102A-N can each include computing devices such as personal computers (PCs), laptops, mobile phones, smart phones, tablet computers, netbook computers, network-connected televisions, etc. In some implementations, client devices 102A-N can also be referred to as "user devices." A client device 102 can include an audiovisual component that can generate audio and video data to be streamed to conference platform 120. In some implementations, the audiovisual component can include one or more devices (e.g., a microphone, etc.) that capture an audio signal representing audio provided by the user. The audiovisual component can generate audio data (e.g., an audio file or audio stream) based on the captured audio signal. In some embodiments, the audiovisual component can additionally or alternatively include one or more devices (e.g., a speaker) that output data to a user associated with a particular client device 102. In some embodiments, the audiovisual component can additionally or alternatively include an image capture device (e.g., a camera) to capture images and generate image data (e.g., a video stream) of the captured images.

In some embodiments, one or more client devices 102 can be devices of a physical conference room or a meeting room. Such client devices 102 can be included at or otherwise coupled to a media system 132 that includes one or more display devices 136, one or more speakers 140 and/or one or more cameras 142. A display device 136 can be or otherwise include a smart display or a non-smart display (e.g., a display that is not itself configured to connect to platform 120 or other components of system 100 via network 104). Users that are physically present in the conference room or the meeting room can use media system 132 rather than their own client devices 102 to participate in a virtual meeting, which can include other remote participants. For example, participants in the conference room or meeting room that participate in the virtual meeting can control display 136 to share a slide presentation with, or watch a slide presentation of, other participants that are accessing the virtual meeting remotely. Sound and/or camera control can similarly be performed. As described above, a client device 102 connected to a media system 132 can generate audio and video data to be streamed to platform 120 (e.g., using one or more microphones (not shown), speaker(s) 140 and/or camera(s) 142).

Client devices 102A-N can each include a client application, in some embodiments. A client application can be a mobile application, a desktop application, a web browser, etc. In some implementations, the client application can present, on a display device 103A-103N of a client device 102A-102N, a user interface (UI) (sometimes referred to as a graphical user interface (GUI)) for users to access a virtual meeting 160 hosted by platform 120. In one or more examples, a user of client device 102A can join and participate in a virtual meeting 160 via UI 124A presented on display 103A via the client application. A user can also present or otherwise share content to other participants of the virtual meeting 160 via each of UIs 124A-124N. Each of UIs 124A-124N can include multiple regions that enable presentation of visual items corresponding to video streams of client devices 102A-102N provided to platform 120 during the virtual meeting 160.

In some embodiments, platform 120 or server 150 can include a watermarking manager 152. Watermarking manager 152 can be configured to apply watermarking to content shared by a participant of the virtual meeting 160 (e.g., presenting participant) and presented via UIs to one or more other participants of the virtual meeting 160 (e.g., observing participant(s)). Content can include, for example, a graphical representation of a video stream, a document (e.g., a presentation), a media item (e.g., a video playback or image), a software code, etc. More specifically, the presenting participant can select content to be shared and presented (e.g., shared content) to the observing participant(s).

In some implementations, the client devices 102A-102N, 104 include a watermarking manager 152. For example, a watermarking manager 152 may be hosted by a client device of an observing participant and a client device of a presenting participant. The watermarking manager 152 hosted by the client device of the observing participant(s) can receive the shared content provided by the client device of the presenting participant, and can determine whether to watermark the shared content. This determination can include determining whether watermarking is enabled for the virtual meeting 160 and/or the shared content. In some embodiments, a host of the virtual meeting 160 or the presenting participant can enable the watermarking for the virtual meeting 160 or the shared content. Depending on the embodiment, the watermarking can be enabled during scheduling of the virtual meeting 160, starting (or initialization) of the virtual meeting, and/or when or prior to sharing the content to observing participant(s) by the presenting participant.

Upon determining that the shared content should be watermarked, the watermarking manager 152 can generate a watermark and superimpose it on the shared content, UI 124 of the virtual meeting, or a portion of the UI 124 on the client device of the observing participant. Depending on the embodiment, the watermarking manager 152 can use one or more watermarking settings to generate the watermark. The one or more watermarking settings can identify, for example, a watermarking template, a watermarking pattern, a level of transparency, and a degree of interactivity. Accordingly, the watermarking manager 152 generates the watermark based on the one or more watermarking settings.

The watermarking template may dictate what text and/or images should be used to generate the watermark. The text can include, for example, information pertaining to the observing participant or the presenting participant (e.g., participant's name or email address), information pertaining to the virtual meeting 160 (e.g., meeting identification), or a current location and/or time stamp. The image can include, for example, a unique visual identifier (e.g., a quick response (QR) code, etc.).

The watermarking pattern may dictate what frequency of the watermarking template (e.g., text or image) should be used to generate the watermark. For example, the watermarking pattern may indicate whether a single instance of the watermarking template should be used to generate the watermark, or more than one instance of the watermarking template should be used to generate the watermark. The watermarking pattern can further dictate a size, an orientation, and/or placement of each instance of the watermarking template.

The level of transparency, as noted above, can dictate an amount of transparency for the watermark. The level of transparency can be from 0% transparency (e.g., opaque or no transparency) to 100% transparency (e.g., fully transparent).

The degree of interactivity can dictate whether the watermark is a static watermark or an interactive (or dynamic) watermark. Interactive watermark refers to a watermark with which a participant can engage (e.g., an observing participant can interact and move the watermark to any position within an UI). Static watermark refers to a watermark which a participant is unable to engage with and/or manipulate (e.g., an observing participant is unable to change the position of the watermark within an UI). Depending on the embodiment, the degree of interactivity can be from 0% interactivity (e.g., static) to 100% interactivity (e.g., fully interactive). Accordingly, as the degree of interactivity increases from 0% to 100%, the distance and/or direction in which the watermarking is allowed to move can increase.

Once the watermark is generated, the watermarking manager 152 can superimpose the watermark on the shared content, the UI of the virtual meeting, or a portion of the virtual meeting UI on the client device of the observing participant. In one embodiment, the watermarking manager 152 generates web-based code (e.g., hypertext markup language (HTML), cascading style sheets (CSS), JavaScript (JS), etc.) that can be executed to superimpose the watermark and incorporates the web-based code into a codebase of the web browser used to present the UI to the observing participant. In another embodiment, the watermarking manager 152 generates a UI element for the watermark using application-based code (e.g., python, etc.) that can be executed to superimpose the watermark and incorporate the UI element into a codebase for the client application used to present the UI to the observing participant.

Based on the degree of interactivity included in the watermarking manager 152, the watermarking manager 152 can further include and/or utilize various frameworks that manage the application state (e.g., interactive state) and update the UI in response to user interactions. The framework can dictate a method of selecting the watermark, a maximum distance in which the watermark can move, a set of directions in which the watermark can move, a maximum number of movements for the watermark, a behavior of the watermark when boundaries are reached, etc.

Once the watermark is superimposed, the watermarking manager 152 can display the shared content with the watermark in the UI. Once displayed, the observing participant can view the shared content with the watermark and/or interact with the watermark. The observing participant, as noted above, can wish to view a portion of the shared content obstructed by the superimposed watermark. Accordingly, the observing participant can provide input to modify a position of the watermark with respect to the shared content. The input can include selecting a portion of the watermark indicating a desire to interact with the watermark, and making a movement gesture indicating a desire to move the portion of the watermark from a current position to a new position with respect to the shared content. The end of the movement gesture can dictate the new position for the portion of the watermark to be moved.

Based on the new position of the portion of the watermark, other portions of the watermark can extend past an edge, a boundary, and/or a corner of the UI. In some embodiments, in response, the other portions of the watermark can wrap around the UI and reappear in the UI via an opposite edge, boundary, and/or corner of the UI. In another embodiment, the watermark can have a predefined dimension. The predefined dimension of the watermark can be an extremely large number to provide the appearance of a watermark that infinitely stretches beyond the edges, boundaries, and/or corners of the UI. Thus, in response, another portion of the watermark not previously visible in the UI can appear within the UI via an opposite edge, boundary, and/or corner of the UI, while the other portions of the watermark that moves past the edge, boundary, and/or corner of the UI can continue to be invisible in the UI. Further details regarding watermarking manager 152 are provided herein.

It should be noted that in some implementations, the functions of platform 120, and/or server machine 150 can be provided by more or a fewer number of machines. For example, in some implementations, components and/or modules of platform 120, and/or server machine 150 can be integrated into a single machine, while in other implementations components and/or modules of any of platform 120, and/or server machine 150 can be integrated into multiple machines. In addition, in some implementations, components and/or modules of and/or server machine 150 can be integrated into platform 120.

In general, functions described in implementations as being performed platform 120, and/or server machine 150 can also be performed on the client devices 102A-N in other implementations. In addition, the functionality attributed to a particular component can be performed by different or multiple components operating together. Platform 120 can also be accessed as a service provided to other systems or devices through appropriate application programming interfaces, and thus is not limited to use in websites.

Although implementations of the disclosure are discussed in terms of a virtual meeting platform 120 and users of platform 120 accessing a virtual meeting 160 hosted by platform 120, aspects of the disclosure are not limited to virtual meeting platforms and can be extended to any type of platforms. For example, aspects of the present disclosure can be used for video playback, image display, product prototype demonstrations, etc.

In implementations of the disclosure, a "user" can be represented as a single individual. However, other implementations of the disclosure encompass a "user" being an entity controlled by a set of users and/or an automated source. For example, a set of individual users federated as a community in a social network can be considered a "user." In another example, an automated consumer can be an automated ingestion pipeline of platform 120.

Further to the descriptions above, a user can be provided with controls allowing the user to make an election as to both if and when systems, programs, or features described herein can enable collection of user information (e.g., information about a user's social network, social actions, or activities, profession, a user's preferences, or a user's current location), and if the user is sent content or communications from a server. In addition, certain data can be treated in one or more ways before it is stored or used, so that personally identifiable information is removed. For example, a user's identity can be treated so that no personally identifiable information can be determined for the user, or a user's geographic location can be generalized where location information is obtained (such as to a city, ZIP code, or state level), so that a particular location of a user cannot be determined. Thus, the user can have control over what information is collected about the user, how that information is used, and what information is provided to the user.

Figure 2A:
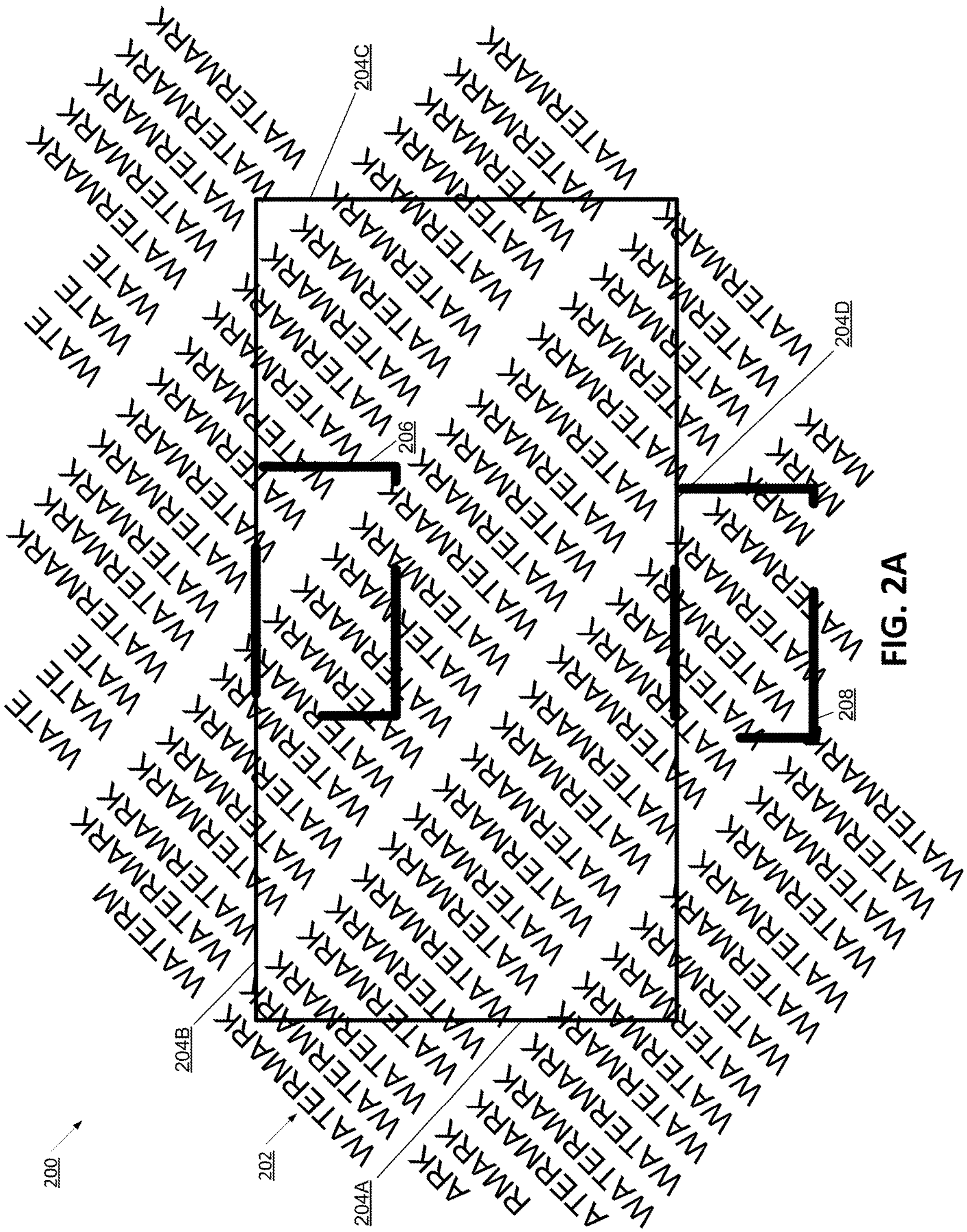
FIGS. 2A and 2B illustrate an example watermark with multiple instances of the watermarking template, in accordance with implementations of the present disclosure.

FIG. 2A illustrates a UI 200 of a platform, similar to platform 120 of FIG. 1 described above. UI 200 is described as a UI displayed on a client device 102 associated with an observing participant of a virtual meeting, similar to virtual meeting 160 of FIG. 1. As previously described, the watermarking manager, similar to watermarking manager 152 of FIG. 1, can generate a watermark 202 based on one or more watermarking settings. The one or more watermarking settings can include, among other things, a watermarking template, and a watermarking pattern. For simplicity, the watermarking template can be a text (e.g., "WATERMARK"). The watermarking pattern can indicate that the text (e.g., "WATERMARK") should appear as a repeated pattern in watermark 202 (e.g., multiple instances of the text (e.g., "WATERMARK")). Accordingly, in order to maintain a certain level of protection, the watermarking pattern can further indicate a size, an orientation, and/or placement of the multiple instances of the text (e.g., "WATERMARK").

Based on the watermarking pattern, the text (e.g., "WATERMARK") is sized, orientated, and placed in a manner that generates the watermark (having multiple instances of the watermarking template) which extends past one or more outer edges of UI 200 (e.g., outer edges 204A-D). Accordingly, if in response to input of the observing participant modifying a position of watermark 202 (superimposed on content shared by a presenting participant) in UI 300, a portion of watermark 202 (e.g., portion 206) is moved past an outer edge (e.g., outer edge 204B), another portion of watermark 202 (e.g., portion 208) can move from outside an opposite outer edge (e.g., outside outer edge 240D) to inside the outer edges of UI 200. In other words, portion 206 is moved from inside the outer edges of UI 200 to outside the outer edges of UI 200 by crossing over outer edge 204B, causing portion 208 to move from outside the outer edges of UI 200 to within the outer edges of UI 200 by crossing over outer edge 204D. This provides an effect of watermark 202 infinitely stretching beyond the outer edges of UI 200 (e.g., outer edges 204A-D).

Figure 2B:
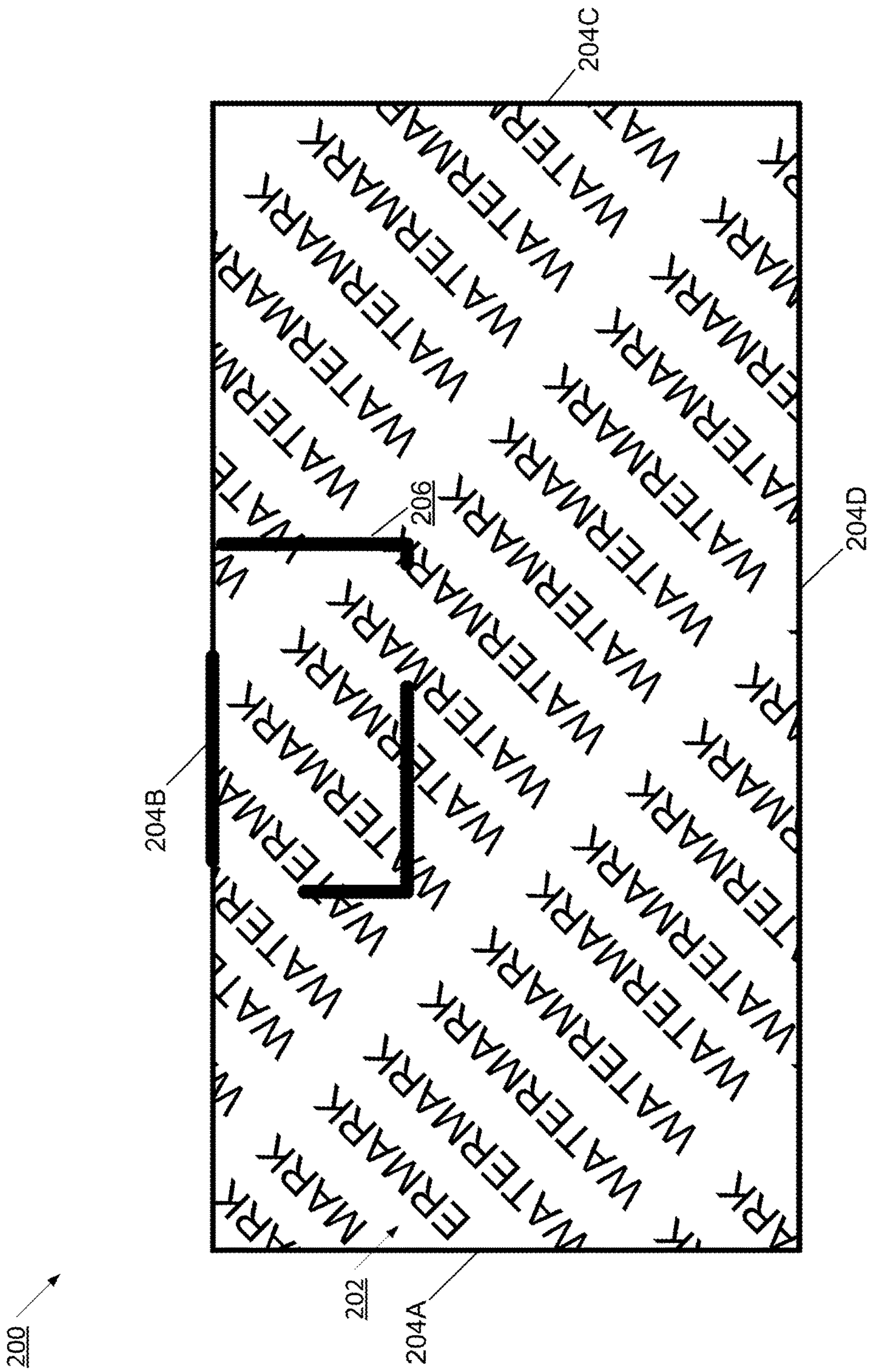

With quick reference to FIG. 2B, based on the watermarking pattern, the text (e.g., "WATERMARK") is sized, orientated, and placed in a manner that generates the watermark 202 which does not extend past an outer edges of UI 200 (e.g., outer edges 204A-D). Accordingly, if in response to input of the observing participant modifying a position of watermark 202 (superimposed on content shared by a presenting participant) in UI 200, a portion of watermark 202 (e.g., portion 206) is moved past an outer edge (e.g., outer edge 204B), the same portion of watermark 202 (e.g., portion 206) can reappear by an opposite outer edge (e.g., outer edge 204D) (not shown in FIG. 2B). In other words, as portion 206 is moved from inside the outer edges of UI 200 to outside the outer edges of UI 200 crossing over outer edge 204B, portion 206 reappears by and within outer edge 204D. This provides an effect of watermark 202 wrapping around the outer edges of UI 200 (e.g., outer edges 204A-D).

Figure 3A:
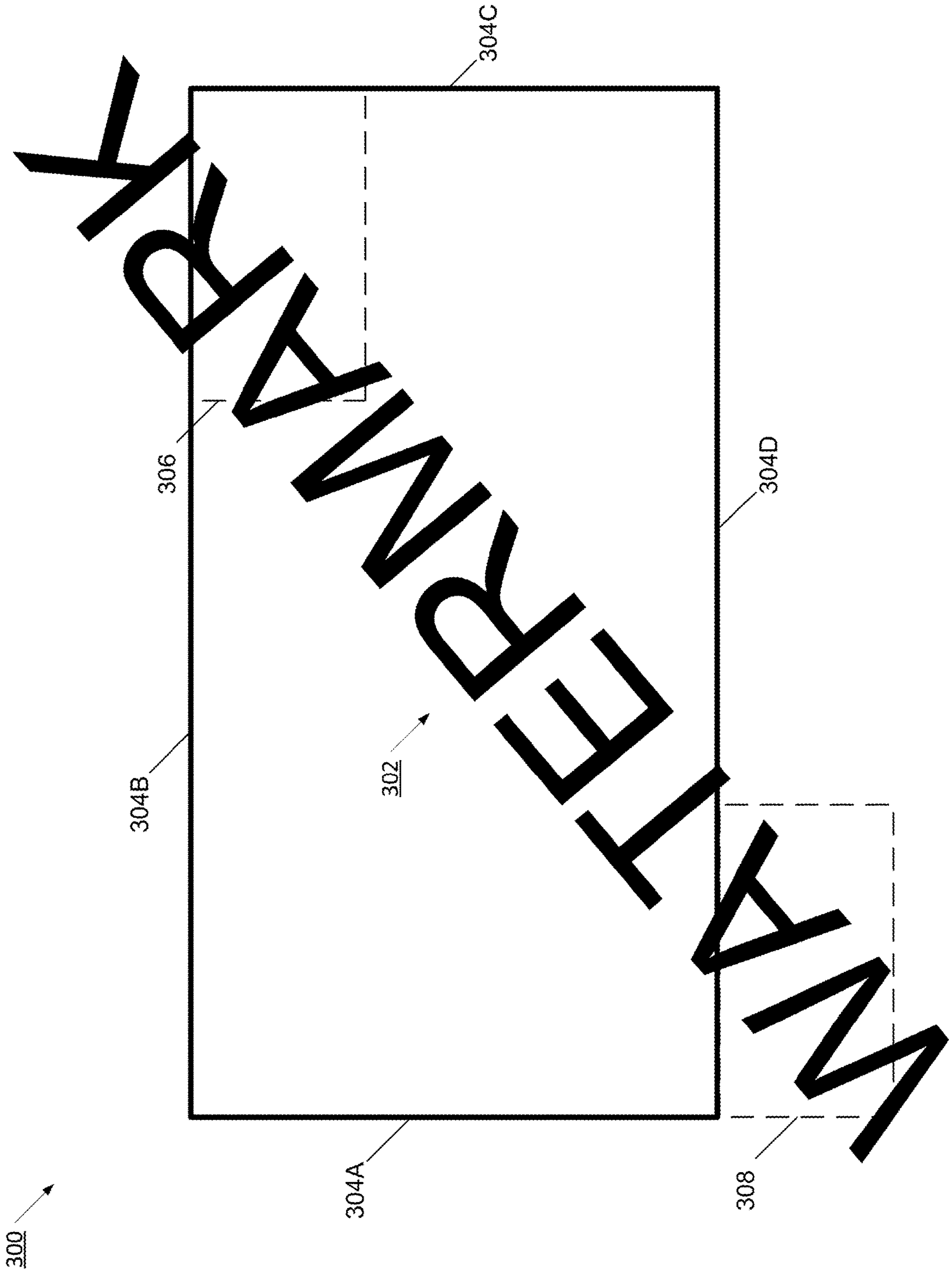
FIGS. 3A and 3B illustrate an example watermark with a single instance of the watermarking template, in accordance with implementations of the present disclosure.

FIG. 3A illustrates a UI 300 of a platform, similar to platform 120 of FIG. 1 described above. UI 300 is described as a UI displayed on a client device 102 associated with an observing participant of a virtual meeting, similar to virtual meeting 160 of FIG. 1. As previously described, the watermarking manager, similar to watermarking manager 152 of FIG. 1, can generate a watermark 302 based on one or more watermarking settings. The one or more watermarking settings can include, among other things, a watermarking template, and a watermarking pattern. For simplicity, the watermarking template can be a text (e.g., "WATERMARK"). The watermarking pattern can indicate that the text (e.g., "WATERMARK") should appear as a single instance in watermark 302. Accordingly, in order to maintain a certain level of protection, the watermarking pattern can further indicate a size, an orientation, and/or placement of the single instance of the text (e.g., "WATERMARK").

Based on the watermarking pattern, the text (e.g., "WATERMARK") can be sized, orientated, and placed in a manner that generates the watermark (having a single instance of the watermarking template) which extends past one or more outer edges of UI 300 (e.g., outer edges 304B and 304D). Accordingly, if in response to input of the observing participant modifying a position of watermark 302 (superimposed on content shared by a presenting participant) in UI 300, a portion of watermark 302 (e.g., portion 306) is moved past an outer edge (e.g., outer edge 304B), another portion of watermark 302 (e.g., portion 308) can be moved from outside an opposite outer edge (e.g., outside outer edge 304D) to within the outer edges of UI 200. In other words, portion 306 is moved from within the outer edges of UI 300 to outside the outer edges of UI 300 by crossing over outer edge 304B, causing portion 308 to move from outside the outer edges of UI 300 to within the outer edges of UI 300 by crossing over outer edge 304D. This provides an effect of watermark 302 infinitely stretching beyond the outer edges of UI 300 (e.g., edges 304A-D).

Figure 3B:
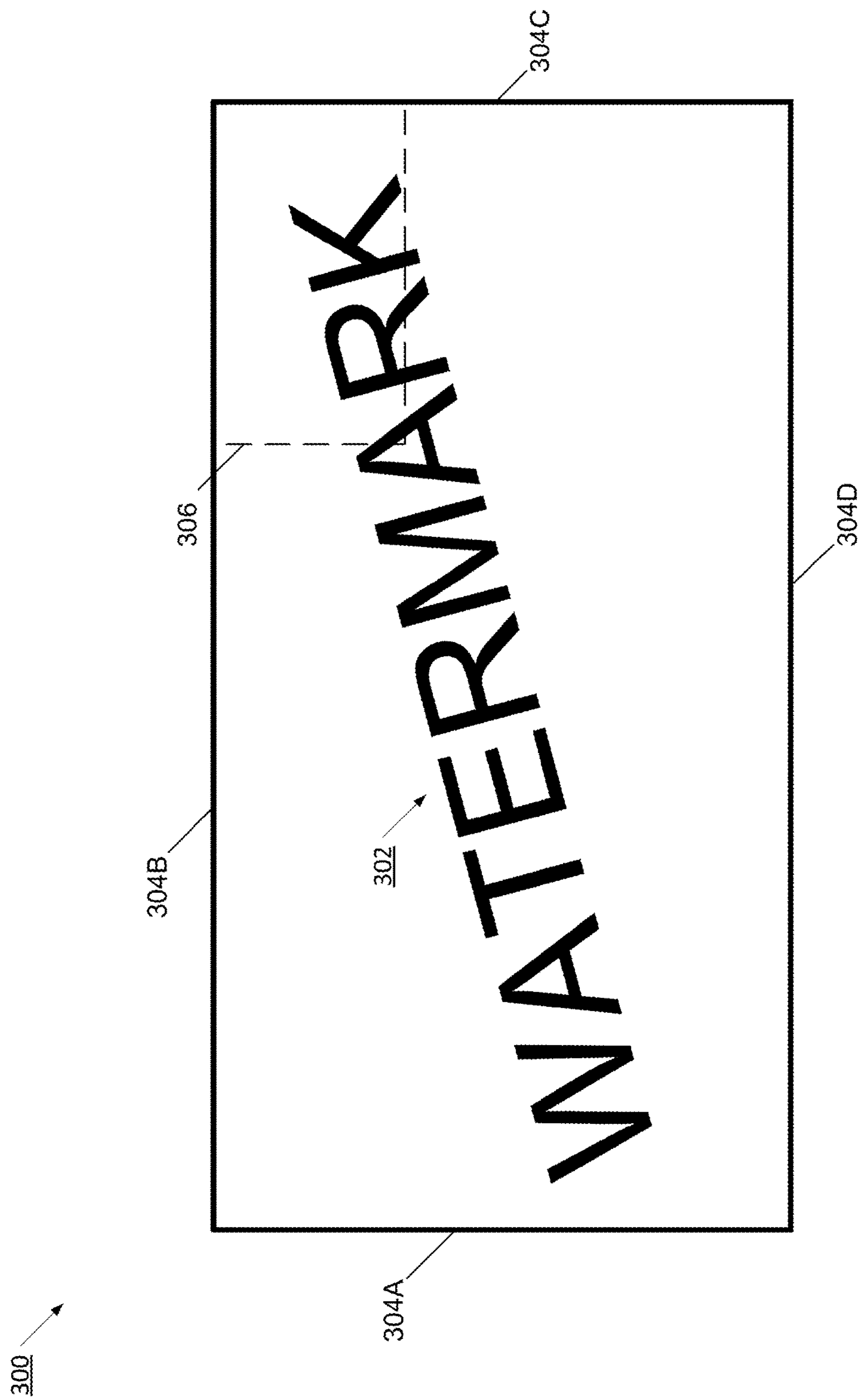

With quick reference to FIG. 3B, based on the watermarking pattern, the text (e.g., "WATERMARK") can be sized, orientated, and placed in a manner that generates the watermark 302 which does not extend past any outer edges of UI 300 (e.g., outer edges 304A-D). Accordingly, if in response to input of the observing participant modifying a position of watermark 302 (superimposed on content shared by a presenting participant) in UI 300, a portion of watermark 302 (e.g., portion 306) is moved past an outer edge (e.g., outer edge 304B), the same portion of watermark 302 (e.g., portion 306) can reappear by an opposite outer edge (e.g., outer edge 304D). In other words, as portion 306 is moved from within the outer edges of UI 200 to outside the outer edges of UI 300 by crossing over outer edge 304B, portion 306 reappears by and within the outer edges of UI 300. This provides an effect of watermark 302 wrapping around the outer edges of UI 300 (e.g., edges 304A-D).

Figure 4A:
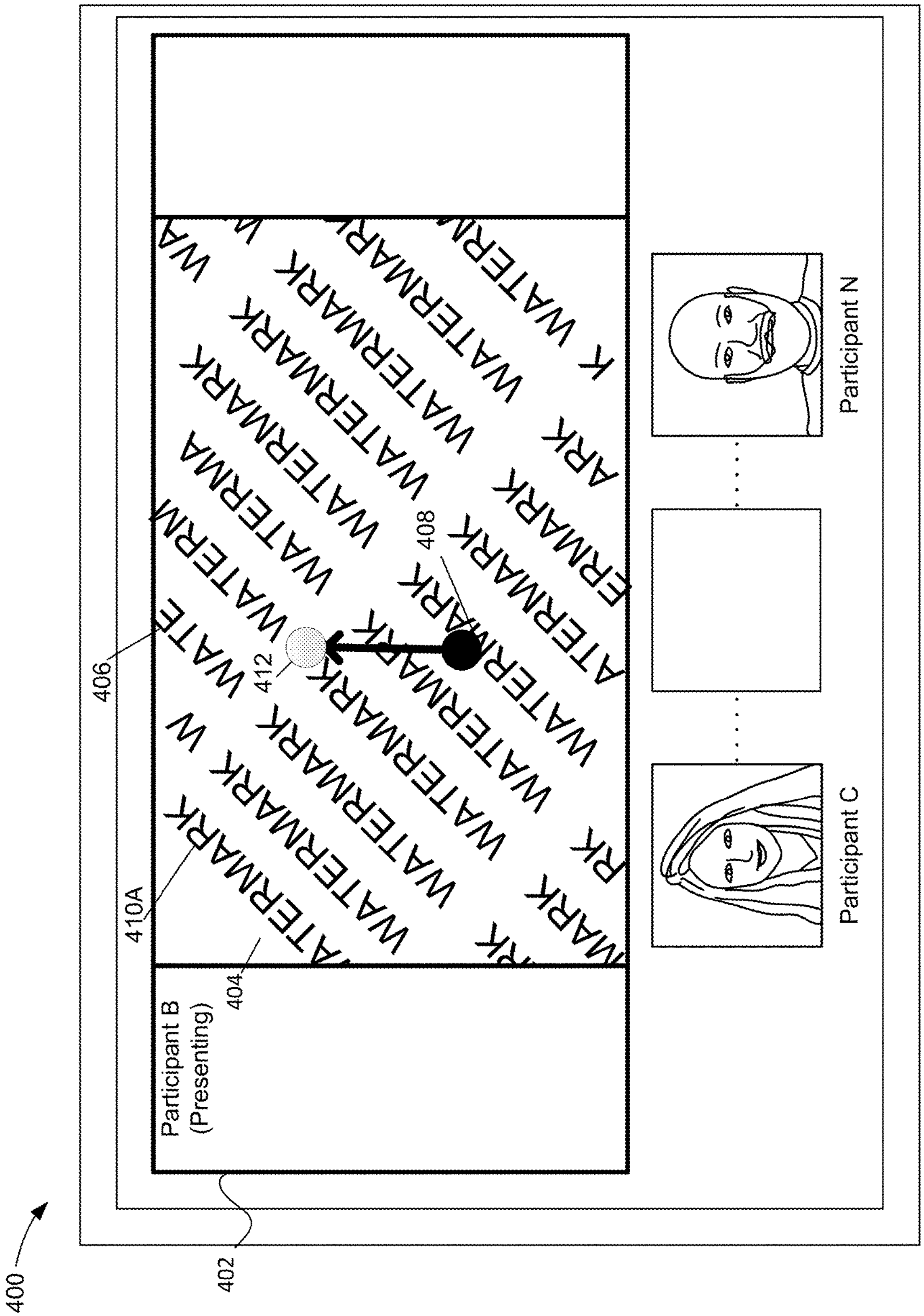
FIGS. 4A and 4B illustrate an example user interface (UI) in which a participant interacts with a watermark, in accordance with implementations of the present disclosure.

FIG. 4A illustrates a user interface (UI) of a virtual meeting, similar to virtual meeting 160 of FIG. 1, between multiple participants via a platform, similar to platform 120 of FIG. 1, in accordance with implementations of the present disclosure. As described above, platform 120 provides a UI 400 to enable participants (e.g., participants A-N) to join and participate in the virtual meeting 160. UI 400 is described as a UI displayed on a client device 102 associated with Participant A of virtual meeting 160. However, UI 400 can be displayed on a client device associated with any participant of virtual meeting 160.

During the virtual meeting 160, Participant B of virtual meeting 160 can share content 404. As previously described, content can include a document (e.g., a presentation), a media item (e.g., a video playback or image), a video stream of Participant B, or a software product. The watermarking manager, similar to watermarking manager 152 of FIG. 1, can generate and superimpose watermark 406 on the shared content 404, UI region 402, or a substantial portion of UI 400 before displaying it in a UI region 402 of the UI 400.

Figure 4B:
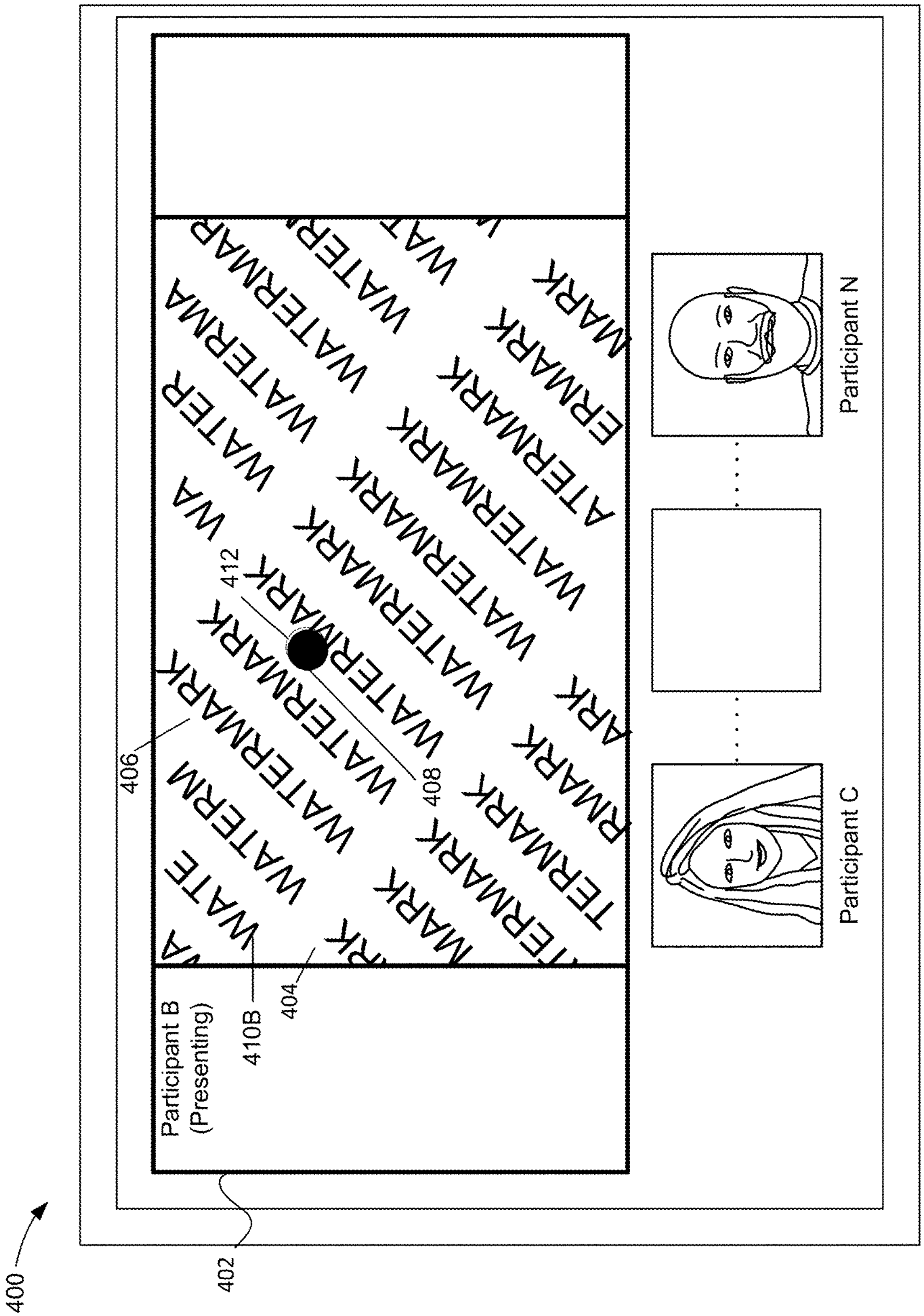

Participant A can select, using a mouse or a pointing device such as a finger, a portion of watermark 406 at location 408 within the UI region 402. Participant A can then drag the selected portion of the watermark 406 from location 408 within the UI region 402 to location 412 within the UI region 402. As a result, portion 410A of watermark 406 which previously appeared in UI region 402, as shown in FIG. 4A, is now no longer visible in UI region 402, as shown in FIG. 4B, and portion 410B of watermark 206 which previously did not appear in UI region 402, as shown in FIG. 4A, is now visible in UI region 402, as shown FIG. 4B. More specifically, portion 410A of watermark 406 moved past an outer edge of the UI region 402 and portion 410B of watermark 406 appeared from an opposite outer edge of the UI region 402.

Figure 5A:
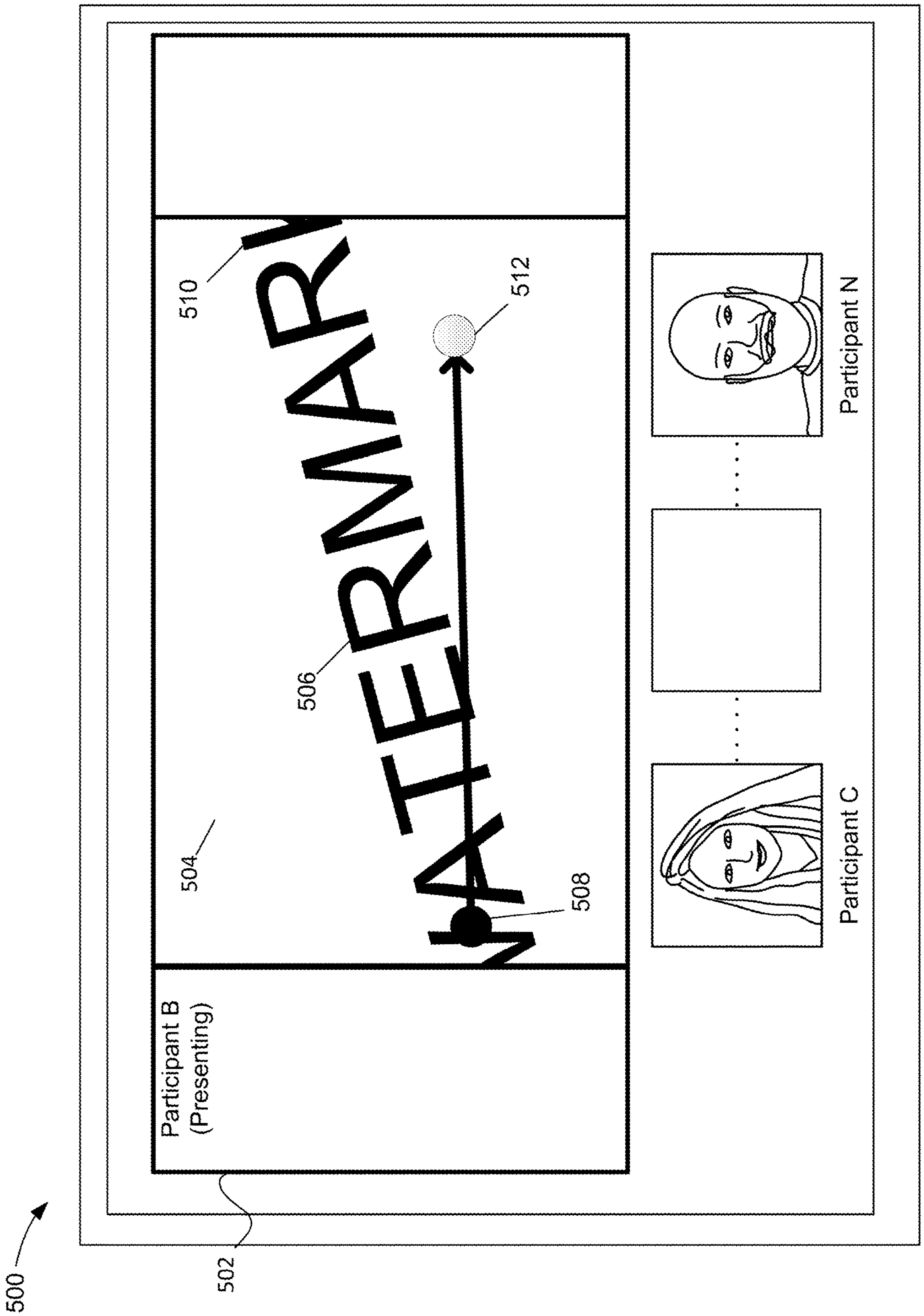
FIGS. 5A and 5B illustrate an example user interface (UI) in which a participant interacts with a watermark, in accordance with implementations of the present disclosure.

FIG. 5A illustrates a user interface (UI) of a virtual meeting, similar to virtual meeting 160 of FIG. 1, between multiple participants via a platform, similar to platform 120 of FIG. 1, in accordance with implementations of the present disclosure. As described above, platform 120 provides a UI 500, similar to UI 124A of FIG. 1, to enable participants (e.g., participants A-N) to join and participate in the virtual meeting 160. UI 500 is described as a UI displayed on a client device 102 associated with Participant A of virtual meeting 160. However, UI 500 can be displayed on a client device associated with any participants of virtual meeting 160.

During the virtual meeting 160, Participant B of virtual meeting 160 can share content 504. As previously described, content can include a document (e.g., a presentation), a media item (e.g., a video playback or image), or a software product. The watermarking manager, similar to watermarking manager 152 of FIG. 1, can generate and superimpose watermark 506 on the shared content 504 before displaying it in a UI region 502 of the UI 500.

Figure 5B:
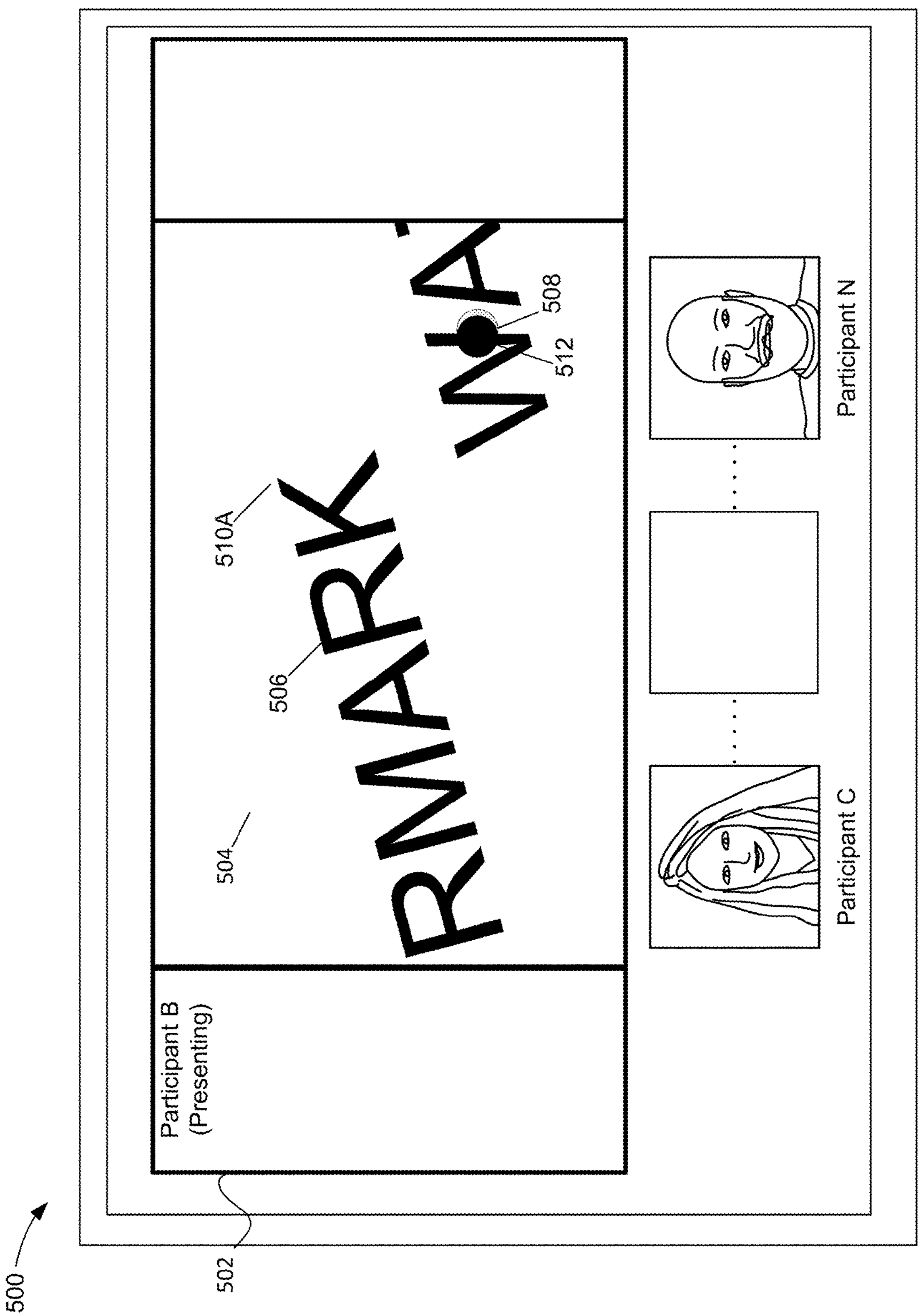

Participant A can select a portion of watermark 506 at location 508 within the UI region 502. Participant A can then drag the selected portion of the watermark 506 from location 508 to location 512 within the UI region 502. As a result, portion 510 of watermark 506 which previously appeared in an initial location of UI region 502, as shown in FIG. 5A, reappears in a new location of UI region 502, as shown in FIG. 5B. More specifically, portion 510 of watermark 506 is moved past an outer edge of UI region 502 and reappears from an opposite outer edge of the UI region 502.

Figure 6:
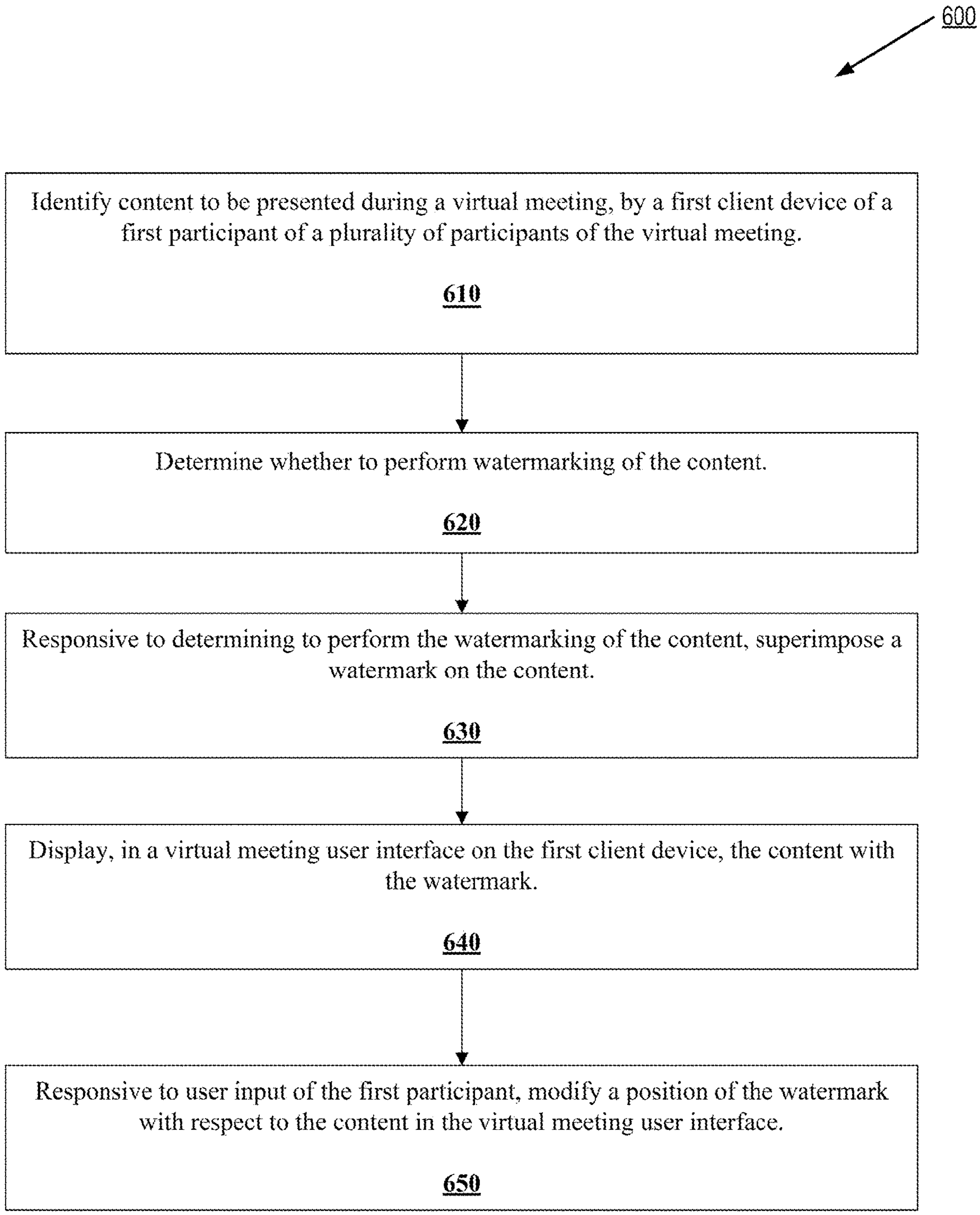
FIG. 6 depicts a flow diagram illustrating an example method for increasing readability of watermarked content in a virtual meeting, in accordance with implementations of the present disclosure.

FIG. 6 depicts a flow diagram of an example method 600 for increasing readability of watermarked content in a virtual meeting, in accordance with implementations of the present disclosure. Method 600 can be performed by processing logic that can include hardware (circuitry, dedicated logic, etc.), software (e.g., instructions run on a processing device), or a combination thereof. In one implementation, some, or all of the operations of method 600 can be performed by one or more components of system 100 of FIG. 1. In some embodiments, some, or all of the operations of method 600 can be performed by watermarking manager 152, as described above.

At block 610, the processing logic identifies content to be presented during a virtual meeting by a first client device of a first participant of a plurality of participants of the virtual meeting. The content can be, for example, content shared by a second participant of the plurality of participants during the virtual meeting, content obtained by the first participant from local storage or external source, etc. The content can be a graphical representation of a video stream of the second participant, a graphical representation of a video playback, an image, a document, or a software code.

At block 620, the processing logic determines whether to watermark the content. As previously described, this determination can include determining whether a watermarking option is enabled for the virtual meeting or the shared content (e.g., by a host of the virtual meeting or the presenting participant). For example, the watermarking component can be enabled during scheduling of the virtual meeting, starting (or initialization) of the virtual meeting, and/or prior to sharing the content to observing participant(s) by the presenting participant.

At block 630, responsive to determining to perform the watermarking of the content, the processing logic superimposes a watermark on the shared content. As previously described, in some embodiments, the processing logic generates the watermark to superimpose on the shared content. The watermark can be generated using watermarking settings, such as, a watermarking template, a watermarking pattern, a level of transparency, and/or a degree of interactivity. As previously described, the watermark can include, based on the watermarking template, text (e.g., information of the first participant, information of the virtual meeting, or a current time stamp) or an image (e.g., a unique identifier such as QR code).

As previously described, the watermarking pattern can indicate a size, an orientation, a placement, and/or a frequency of the watermarking template (e.g., whether a single instance of the watermarking template is used to generate the watermark or more than one instance of the watermarking template is used to generate the watermark). The level of transparency can indicate an amount of transparency for the watermark. The degree of interactivity can indicate a degree of interactivity (e.g., whether the watermark is a static watermark or an interactive watermark).

As previously described, once the watermark is generated, the processing logic can superimpose the watermark on the shared content using web-based code incorporated into a codebase of the web browser or a UI element incorporated into a codebase for the client application used to present the UI of the observing participant. The web-based code or the UI element can further include framework that manages the applications state (e.g., interactive state) and updates the UI in response to user interaction changes. The framework can dictate a method of selecting the watermark, a maximum distance in which the watermark can move, a set of directions in which the watermark can move, a maximum number of movements for the watermark, a behavior of the watermark when boundaries are reached, etc.

At block 640, the processing logic displays, in a virtual meeting user interface on the first client device, the content with the watermark. At block 650, responsive to input of the first participant, the processing logic modifies a position of the watermark with respect to the content in the virtual meeting user interface.

The input of the first participant can include selecting a portion of the watermark and dragging the portion of the watermark (e.g., a movement gesture) within the virtual meeting user interface. The input can be received via a mouse and/or a touchscreen of the client device of the first participant.

In some embodiments, modifying the position of the watermark with respect to the content in the virtual meeting user interface includes identifying a new position for a first portion of the watermark and moving the first portion of the watermark from a current position to the new position. As previously described, the end of the movement gesture can define the new position.

In some embodiments, the processing logic determines whether a second portion of the watermark extended past a first boundary of the virtual meeting user interface. The first boundary of the virtual meeting user interface can be an edge or corner of the virtual meeting user interface (e.g., UI). Responsive to determining that the second portion of the watermark extended past a first boundary of the virtual meeting user interface, in some embodiments the processing logic causes the second portion of the watermark to reappear by a second boundary of the virtual meeting user interface. The first boundary of the virtual meeting user interface can be opposite to the second boundary of the virtual meeting user interface. As previously described, due to the size, orientation, and placement of the text, the watermark may be generated such that it does not extend past a boundary of the virtual meeting user interface. Thus, the watermark provides the effects of wrapping around the outer boundaries of the virtual meeting user interface when a portion of the watermark extends past a boundary of the virtual meeting user interface.

In some embodiments, the processing logic causes a third portion of the watermark to appear from a second boundary of the virtual meeting user interface. The first boundary of the virtual meeting user interface is opposite the second boundary of the virtual meeting user interface. As previously described, due to the size, orientation, and placement of the text, the watermark may be generated such that it can extend past the boundaries of the virtual meeting user interface. Thus, the watermark provides the effects of infinitely stretching beyond the boundaries of the virtual meeting user interface. Accordingly, the first portion and the second portion of the watermark are visible within the virtual meeting user interface, while the third portion of the watermark is outside the virtual meeting user interface and not visible. Thus, when the second portion of the watermark is moved past the first boundary, the third portion of the watermark appears at the second boundary of the virtual meeting user interface.

Figure 7:
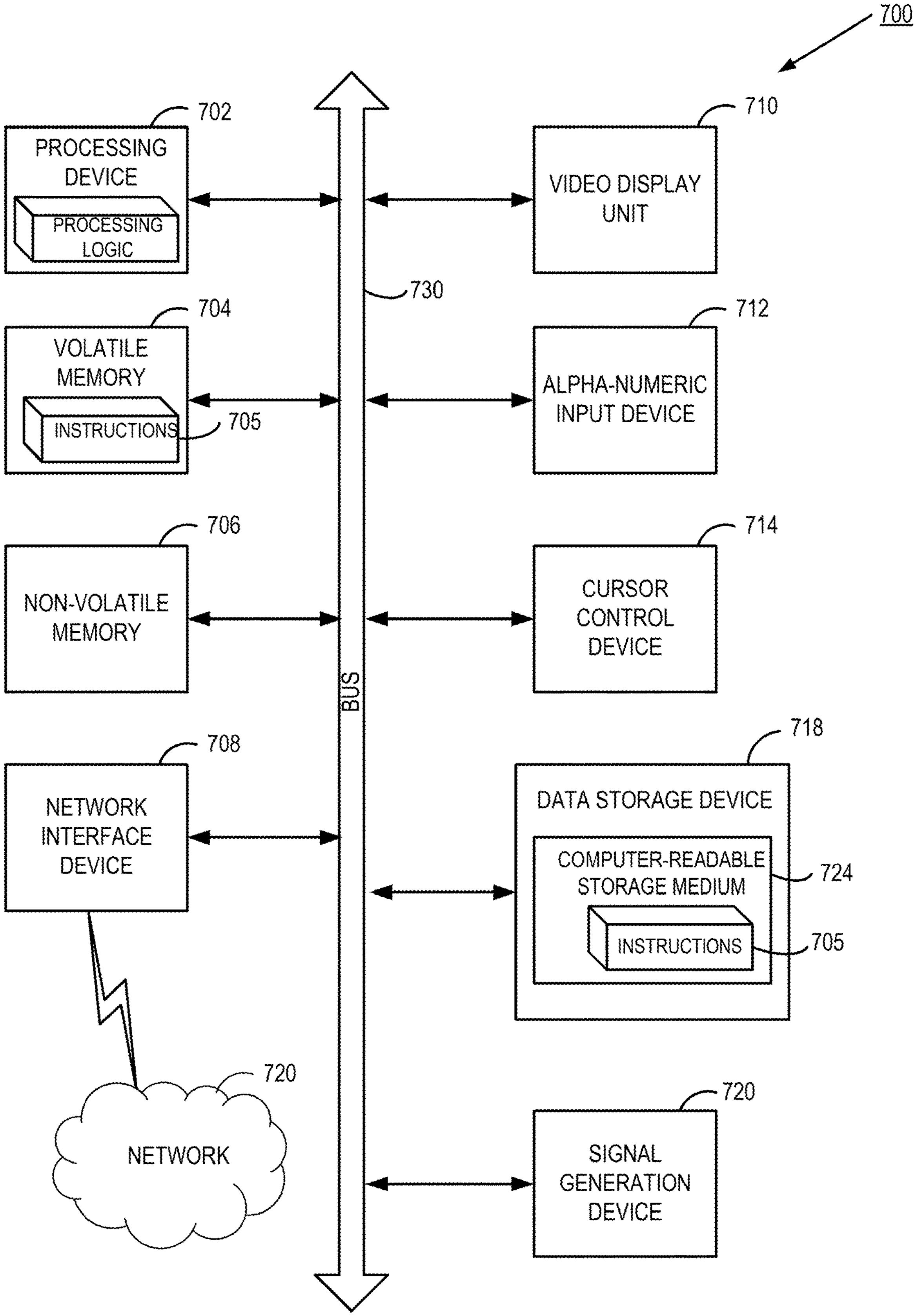
FIG. 7 is a block diagram illustrating an exemplary computer system, in accordance with implementations of the present disclosure.

FIG. 7 is a block diagram illustrating an exemplary computer system 700, in accordance with implementations of the present disclosure. The computer system 700 can correspond to platform 120 and/or client devices 102A-N, described with respect to FIG. 1. Computer system 700 can operate in the capacity of a server or an endpoint machine in endpoint-server network environment, or as a peer machine in a peer-to-peer (or distributed) network environment. The machine can be a television, a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 718, which communicate with each other via a bus 740.

Processor (processing device) 702 represents one or more general-purpose processing devices such as a microprocessor, central processing unit, or the like. More particularly, the processor 702 can be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 can also be one or more special-purpose processing devices such as an application specific integrated circuit (ASIC), a field programmable gate array (FPGA), a digital signal processor (DSP), network processor, or the like. The processor 702 is configured to execute instructions 705 (e.g., improving precision of content matching systems at a platform) for performing the operations discussed herein.

The computer system 700 can further include a network interface device 708. The computer system 700 also can include a video display unit 710 (e.g., a liquid crystal display (LCD) or a cathode ray tube (CRT)), an input device 712 (e.g., a keyboard, and alphanumeric keyboard, a motion sensing input device, touch screen), a cursor control device 714 (e.g., a mouse), and a signal generation device 720 (e.g., a speaker).

The data storage device 718 can include a non-transitory machine-readable storage medium 724 (also computer-readable storage medium) on which is stored one or more sets of instructions 705 (e.g., improving precision of content matching systems at a platform) embodying any one or more of the methodologies or functions described herein. The instructions can also reside, completely or at least partially, within the main memory 704 and/or within the processor 702 during execution thereof by the computer system 700, the main memory 704 and the processor 702 also constituting machine-readable storage media. The instructions can further be transmitted or received over a network 730 via the network interface device 708.

In one implementation, the instructions 705 include instructions for providing fine-grained version histories of electronic documents at a platform. While the computer-readable storage medium 724 (machine-readable storage medium) is shown in an exemplary implementation to be a single medium, the terms "computer-readable storage medium" and "machine-readable storage medium" should be taken to include a single medium or multiple media (e.g., a centralized or distributed database, and/or associated caches and servers) that store the one or more sets of instructions. The terms "computer-readable storage medium" and "machine-readable storage medium" shall also be taken to include any medium that is capable of storing, encoding, or carrying a set of instructions for execution by the machine and that cause the machine to perform any one or more of the methodologies of the present disclosure. The terms "computer-readable storage medium" and "machine-readable storage medium" shall accordingly be taken to include, but not be limited to, solid-state memories, optical media, and magnetic media.

Reference throughout this specification to "one implementation," "some embodiments" "one embodiment," "an implementation," or "an embodiment," means that a particular feature, structure, or characteristic described in connection with the implementation and/or embodiment is included in at least one implementation and/or embodiment. Thus, the appearances of the phrase "in one implementation," or "in an implementation," in various places throughout this specification can, but are not necessarily, referring to the same implementation, depending on the circumstances. Furthermore, the particular features, structures, or characteristics can be combined in any suitable manner in one or more implementations.

To the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

As used in this application, the terms "component," "module," "system," or the like are generally intended to refer to a computer-related entity, either hardware (e.g., a circuit), software, a combination of hardware and software, or an entity related to an operational machine with one or more specific functionalities. For example, a component can be, but is not limited to being, a process running on a processor (e.g., digital signal processor), a processor, an object, an executable, a thread of execution, a program, and/or a computer. By way of illustration, both an application running on a controller and the controller can be a component. One or more components can reside within a process and/or thread of execution and a component can be localized on one computer and/or distributed between two or more computers. Further, a "device" can come in the form of specially designed hardware; generalized hardware made specialized by the execution of software thereon that enables hardware to perform specific functions (e.g., generating interest points and/or descriptors); software on a computer readable medium; or a combination thereof.

The aforementioned systems, circuits, modules, and so on have been described with respect to interact between several components and/or blocks. It can be appreciated that such systems, circuits, components, blocks, and so forth can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components can be combined into a single component providing aggregate functionality or divided into several separate sub-components, and any one or more middle layers, such as a management layer, can be provided to communicatively couple to such sub-components in order to provide integrated functionality. Any components described herein can also interact with one or more other components not specifically described herein but known by those of skill in the art.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Finally, implementations described herein include collection of data describing a user and/or activities of a user. In one implementation, such data is only collected upon the user providing consent to the collection of this data. In some implementations, a user is prompted to explicitly allow data collection. Further, the user can opt-in or opt-out of participating in such data collection activities. In one implementation, the collect data is anonymized prior to performing any analysis to obtain any statistical patterns so that the identity of the user cannot be determined from the collected data.

What is claimed is:

1. A method comprising:

determining whether to perform watermarking of content presented during a virtual meeting on a first client device of a first participant of a plurality of participants of the virtual meeting;

responsive to determining to perform the watermarking of the content, superimposing a watermark on the content;

displaying, in a virtual meeting user interface on the first client device, the content with the watermark;

receiving, during the virtual meeting, input of the first participant to modify a position of the watermark in the virtual meeting user interface on the first client device, wherein the watermark obstructs a portion of the content in the virtual meeting user interface on the first client device; and responsive to receiving the input of the first participant during the virtual meeting, modifying the position of the watermark to cause the portion of the content to be visible in the virtual meeting user interface on the first client device.

2. The method of claim 1, wherein the input of the first participant corresponds to a selection of a portion of the watermark, and a movement gesture within the virtual meeting user interface.

3. The method of claim 1, wherein determining whether to perform watermarking of the content comprises determining whether a watermarking option is enabled for at least one of the virtual meeting or the content.

4. The method of claim 1, wherein modifying the position of the watermark with respect to the content in the virtual meeting user interface comprises:

identifying a new position for a first portion of the watermark; and moving, based on the new position, the first portion of the watermark from a current position to the new position in the virtual meeting user interface.

5. The method of claim 4, wherein moving, based on the new position, the first portion of the watermark from the current position to the new position in the virtual meeting user interface comprises:

determining whether a second portion of the watermark extends past a first boundary of the virtual meeting user interface; and responsive to determining that the second portion of the watermark extends past the first boundary of the virtual meeting user interface, causing the second portion of the watermark to reappear by a second boundary of the virtual meeting user interface, wherein the first boundary of the virtual meeting user interface is opposite to the second boundary of the virtual meeting user interface.

6. The method of claim 4, wherein moving, based on the new position, the first portion of the watermark from the current position to the new position in the virtual meeting user interface comprises:

determining whether a second portion of the watermark extends past a first boundary of the virtual meeting user interface; and responsive to determining that the second portion of the watermark extends past the first boundary of the virtual meeting user interface, causing a third portion of the watermark to appear by a second boundary of the virtual meeting user interface, wherein the first boundary of the virtual meeting user interface is opposite to the second boundary of the virtual meeting user interface.

7. The method of claim 1, wherein the watermark includes at least one of: information pertaining to the first participant, information pertaining to the virtual meeting, a current time stamp, or a unique identifier.

8. The method of claim 1, wherein the content is one of: a representation of a video stream of a second participant of the plurality of participants, a representation of a video playback, an image, a document, or a software product.

9. A system comprising:

a memory device; and a processing device coupled to the memory device, the processing device to perform operations comprising:

determining whether to perform watermarking of content presented during a virtual meeting on a first client device of a first participant of a plurality of participants of the virtual meeting;

responsive to determining to perform the watermarking on the content, superimposing a watermark on the content;

displaying, by the processing device, the content with the watermark in a virtual meeting user interface of the virtual meeting;

receiving, during the virtual meeting, input of the first participant to modify a position of the watermark in the virtual meeting user interface on the first client device, wherein the watermark obstructs a portion of the content in the virtual meeting user interface on the first client device; and responsive to receiving the input of the first participant during the virtual meeting, modifying the position of the watermark to cause the portion of the content to be visible in the virtual meeting user interface on the first client device.

10. The system of claim 9, wherein the input corresponds to a selection of a watermark of the watermark, and a movement in direction in the virtual meeting user interface of the virtual meeting.

11. The system of claim 9, wherein determining whether to perform watermarking of the content comprises determining whether a watermarking option is enabled for at least one of the virtual meeting or the content.

12. The system of claim 9, wherein modifying the position of the watermark with respect to the content in the virtual meeting user interface of the virtual meeting comprises:

identifying a new position for a first portion of the watermark; and moving, based on the new position, the first portion of the watermark from a current position to the new position in the virtual meeting user interface.

13. The system of claim 12, wherein moving, based on the new position, the first portion of the watermark from the current position to the new position in the virtual meeting user interface comprises:

determining whether a second portion of the watermark extends past a first boundary of the virtual meeting user interface; and responsive to determining that the second portion of the watermark extends past the first boundary of the virtual meeting user interface, causing the second portion of the watermark to reappear by a second boundary of the virtual meeting user interface, wherein the first boundary of the virtual meeting user interface is opposite to the second boundary of the virtual meeting user interface.

14. The system of claim 12, wherein moving, based on the new position, the first portion of the watermark from the current position to the new position in the virtual meeting user interface comprises:

determining whether a second portion of the watermark extends past a first boundary of the virtual meeting user interface; and responsive to determining that the second portion of the watermark extends past the first boundary of the virtual meeting user interface, causing a third portion of the watermark to appear by a second boundary of the virtual meeting user interface, wherein the first boundary of the virtual meeting user interface is opposite to the second boundary of the virtual meeting user interface.

15. A non-transitory machine-readable storage medium storing instructions which, when executed, cause a processing device to perform operations comprising:

determining whether to perform watermarking of content presented during a virtual meeting on a first client device of a first participant of a plurality of participants of the virtual meeting;

responsive to determining to perform the watermarking of the content, superimposing a watermark on the content;

displaying, in a virtual meeting user interface on the first client device, the content with the watermark;

receiving, during the virtual meeting, input of the first participant to modify a position of the watermark in the virtual meeting user interface on the first client device, wherein the watermark obstructs a portion of the content in the virtual meeting user interface on the first client device; and responsive to receiving the input of the first participant during the virtual meeting, modifying the position of the watermark to cause the portion of the content to be visible in the virtual meeting user interface on the first client device.

16. The non-transitory machine-readable storage medium of claim 15, wherein modifying the position of the watermark with respect to the content in the virtual meeting user interface comprises:

identifying a new position for a first portion of the watermark; and moving, based on the new position, the first portion of the watermark from a current position to the new position in the virtual meeting user interface.

17. The non-transitory machine-readable storage medium of claim 16, wherein moving, based on the new position, the first portion of the watermark from the current position to the new position in the virtual meeting user interface comprises:

determining whether a second portion of the watermark extends past a first boundary of the virtual meeting user interface; and responsive to determining that the second portion of the watermark extends past the first boundary of the virtual meeting user interface, causing the second portion of the watermark to reappear by a second boundary of the virtual meeting user interface, wherein the first boundary of the virtual meeting user interface is opposite to the second boundary of the virtual meeting user interface.

18. The non-transitory machine-readable storage medium of claim 16, wherein moving, based on the new position, the first portion of the watermark from the current position to the new position in the virtual meeting user interface comprises:

determining whether a second portion of the watermark extends past a first boundary of the virtual meeting user interface; and responsive to determining that the second portion of the watermark extends past the first boundary of the virtual meeting user interface, causing a third portion of the watermark to appear by a second boundary of the virtual meeting user interface, wherein the first boundary of the virtual meeting user interface is opposite to the second boundary of the virtual meeting user interface.

19. The non-transitory machine-readable storage medium of claim 15, wherein the watermark includes at least one of: information pertaining to the first participant, information pertaining to the virtual meeting, a current time stamp, or a unique identifier.

20. The non-transitory machine-readable storage medium of claim 15, wherein the content is one of: a representation of a video stream of a second participant, a representation of a video playback, an image, a document, or a software product.

* * * * *